Nov. 12, 1940.  R. J. BURROWS ET AL  2,221,075
BRAKE MECHANISM
Original Filed March 12, 1938   5 Sheets-Sheet 1

INVENTORS.
ROBERT J. BURROWS, ALFRED O. WILLIAMS, WILLIAM L. DAVIS.
BY *Walter E. Schirmer*
ATTORNEY.

Nov. 12, 1940.     R. J. BURROWS ET AL     2,221,075
BRAKE MECHANISM
Original Filed March 12, 1938     5 Sheets-Sheet 2

INVENTORS.
ROBERT J. BURROWS, ALFRED O. WILLIAMS, WILLIAM L. DAVIS,
BY Walter E. Schirmer
ATTORNEY.

Nov. 12, 1940.  R. J. BURROWS ET AL  2,221,075
BRAKE MECHANISM
Original Filed March 12, 1938  5 Sheets-Sheet 3

INVENTORS.
ROBERT J. BURROWS, ALFRED O. WILLIAMS, WILLIAM L. DAVIS.
BY Walter E. Schirmer
ATTORNEY.

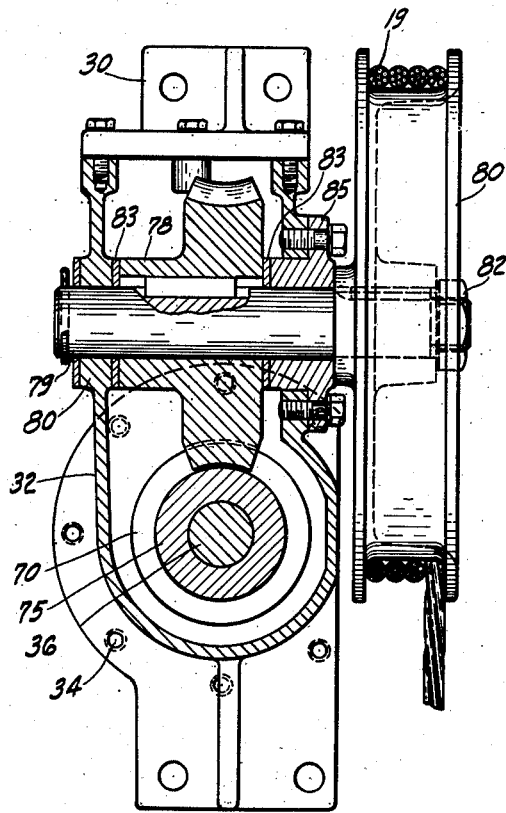

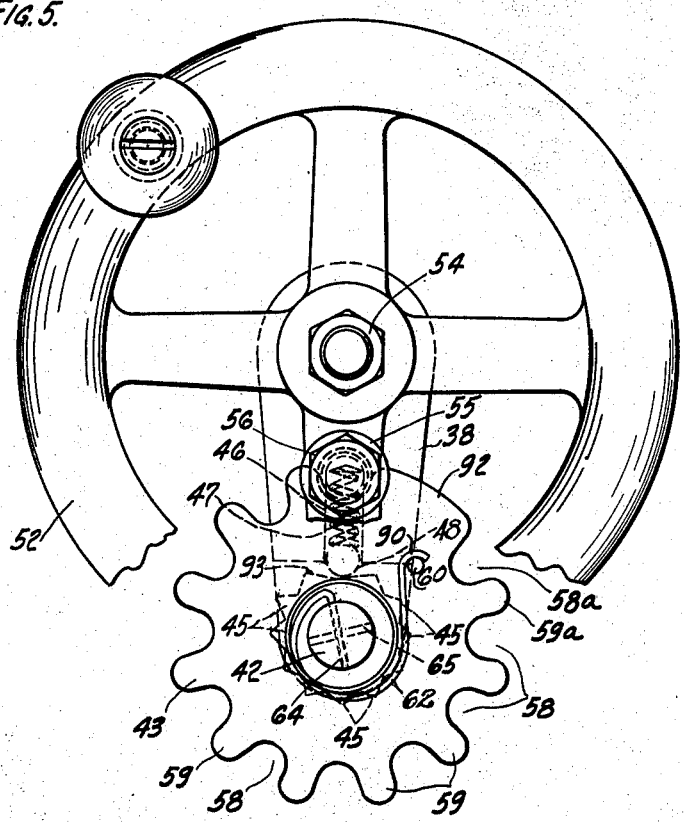

Patented Nov. 12, 1940

2,221,075

UNITED STATES PATENT OFFICE 2,221,075

BRAKE MECHANISM

Robert J. Burrows, Alfred O. Williams and William L. Davis, Battle Creek, Mich., assignors to Clark Equipment Company, Buchanan, Mich., a corporation of Michigan Original application March 12, 1938, Serial No. 195,532. Divided and this application February 16, 1939, Serial No. 256,658

10 Claims. (Cl. 188—197)

This invention relates to a brake mechanism, and more particularly is directed to a brake mechanism for use with brakes employed on the wheels of a rail car truck or other type of rail vehicle.

The present application is a division of Robert J. Burrows et al. copending application, Serial No. 195,532, filed March 12, 1938.

In trucks of this type, pneumatic means is usually provided for actuating the brake shoes into engagement with the rims of the car wheels. However, when the car or rail vehicle is to be spotted at a particular location, or parked with the power turned off, it is necessary to provide some hand brake mechanism for holding the car against movement.

The present invention contemplates a hand brake mechanism operable from within the car for setting the brake shoes against the truck wheels, so arranged that substantially equal pressure is applied by the shoes at each wheel, and in which only a single control cable is provided between the actuating mechanism and the car truck.

One of the main objects of the present invention is the provision of a hand brake mechanism having an actuating member within the car body, and connected by a cable to a lever and link arrangement supported on the brake mechanism and cross connected in such manner as to secure substantially uniform application of the brakes at each wheel. The mechanism includes adjustable means for taking up inequalities between the two cross-shafts upon which the respective pairs of brake heads are mounted.

In one of the preferred forms of the invention this adjusting means takes the form of a pivotally mounted arm carried above one of the shafts and adjustably rotated on its support. With such means we are able to provide for proper adjustment and at the same time prevent the introduction of any appreciable slack in the brake system when the brakes are pneumatically, hydraulically or otherwise power actuated. This is of distinct advantage as it eliminates the dangers due to introduction of too much slack in the hand brake system, and still in no wise interferes with the power application of the brakes.

Another feature of primary importance provided by the present invention is the slack adjusting means for controlling the amount of slack in the hand brake system. A certain amount of slack is desirable with the brakes in the off position, in order to avoid interference with the power application of the brakes. However, the slack must be definitely limited to prevent exceeding a predetermined amount so that no danger of entangling this mechanism in other portions of the truck will occur.

We have provided a mechanism which, regardless of the amount of take-up that may be required for proper application of the hand brakes, will always allow only a predetermined amount of slack. Thus, while the actuating member may be rotated through as many turns as necessary to apply the hand brakes, it can be reversely rotated only a predetermined number of turns from any brake applied position. This definitely limits the possible amount of slack in the system to a predetermined amount.

In case it is necessary, for repair of replacement of portions of the brake system, to have more slack, this can be obtained by release of the slack adjusting means either from within the car or from below the car. However, the slack adjusting means is automatically reset upon operation of the actuating mechanism and functions to limit the amount of slack after such repair or replacement without any further attention on the part of the operator.

Another feature of the present invention is the extreme simplicity of the brake linkage and actuating mechanism, rendering it economical to manufacture, and also allowing its ready installation in existing structures.

Other objects and advantages of the present invention will be more apparent from the following detailed description which, taken in conjunction with the accompanying drawings, will disclose to those skilled in the art the particular construction and operation of a preferred form of the present invention.

Figure 2:
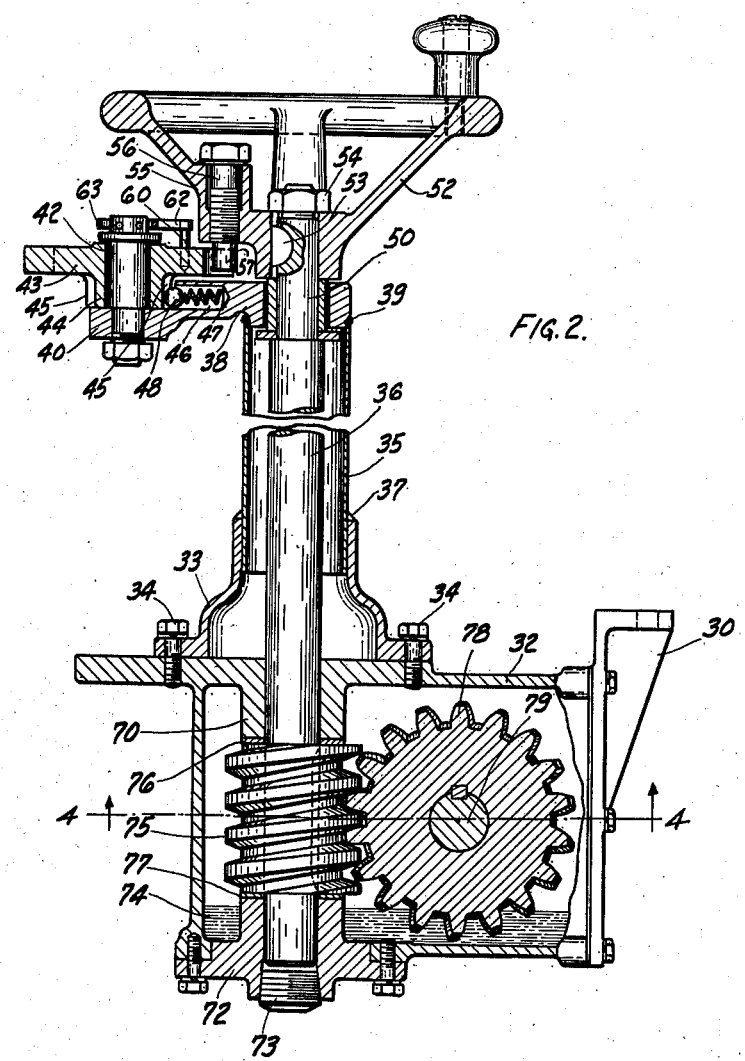
Figure 2 is a vertical, sectional view through the actuating means for the structure shown in Figure 1.

Fgure 3 is a view similar to Figure 2 showing a modification thereof;

Figure 4 is a sectional view taken substantially on line 4—4 of Figure 2; and

Figure 5 is a top plan view of the structure shown in Figure 2, with portions thereof broken away.

Figure 1:
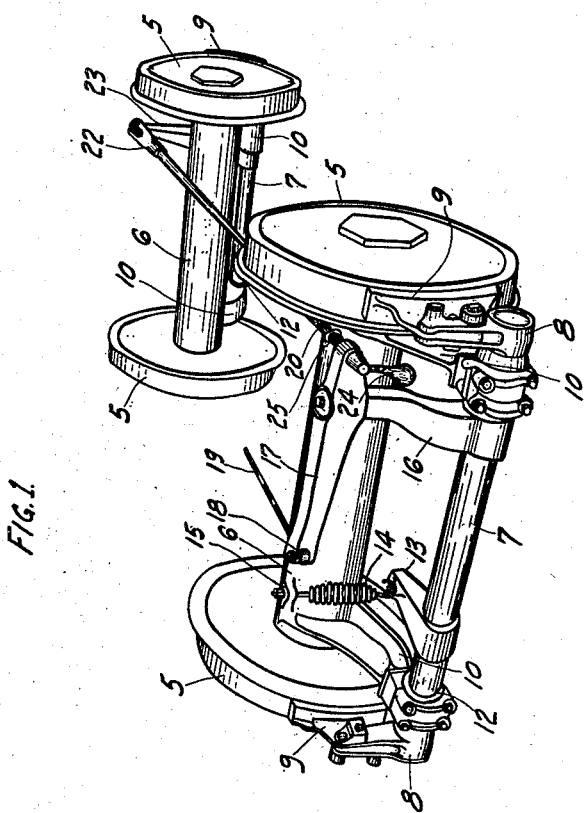
Figure 1 is a perspective view, largely diagrammatic, of one form of the present invention.

Referring now in detail to the drawings, we have disclosed in Figure 1 a diagrammatic representation of a rail car truck having the wheels 5 carried by the transversely extending axle sections 6.

Disposed outwardly beyond each axle section 6 there is provided a cross shaft indicated at 7, which at the opposite ends thereof is adapted to carry the brake heads 8 rigidly secured thereto and in turn supporting the brake shoes 9 thereon. The particular type of brake head and brake shoe assembly is preferably similar to that disclosed in the Burrows and Williams patent, No. 2,097,584, issued November 2, 1937. The cross shafts 7 are preferably supported by suitable brackets 10 carried by the axle sections 6, and are journalled for rotation in the bearing sleeves 12.

Each of the cross shafts 7 is also provided with a generally horizontally extending arm portion 13 which, at its free end is connected by means of the spring 14 to a suitable boss 15 on the axle frame which normally tends to rotate the shafts into brake-releasing position.

It is to be understood that in a construction of this type suitable pneumatic or other power operated means is provided for actuating each of the shafts 7 during normal operation of the vehicle, but since the details of such power actuating mechanism form no part of the present invention, it is not believed necessary to describe the same. Suffice it to say that the normal power operation results in a rotational thrust on the shafts 7 rotating the brake heads 8 into position to apply the brake shoes 9 to the tread surfaces of the wheels 5.

Considering now in detail the particular hand brake operating mechanism disclosed in the present invention, it will be noted that one of the shafts 7 is provided with a generally vertically extending arm 16 which is rigidly secured thereto adjacent one of the bracket supports 10, and which at its upper end is provided with suitable bearing means for receiving the transversely extending lever 17 which is pivotally mounted thereon intermediate its ends. The longer extending arm of the lever 17 is provided with a yoke portion 18 to which is connected a flexible tension cable 19 leading to any suitable actuating means within the car, as will be described in detail hereinafter.

The opposite end of the lever 17 is provided with an aperture through which extends the end of a rod 20, the rod 20 extending longitudinally of the truck and being pivotally connected as indicated at 22 at its opposite end to the free end of an arm 23 rigidly secured to the opposite shaft 7.

The end of the rod 20 which extends through the lever 17 is provided with a crank portion 24 which is adapted to be rotated in opposite directions to produce variations in the length of the rod 20, a threaded connection for effecting this being indicated at 25. It will thus be seen that the crank 24 provides means for adjusting the relative angular position of the arms 16 and 23 so that an equalized braking pressure will be applied to the shafts 7.

In the operation of the structure thus far described, tension exerted upon the cable 19 will result in a tendency for the arm 17 to rotate in a clockwise direction about the bearing at the upper end of the arm 16 as viewed in Figure 1. This produces a tension upon the rod 20 resulting in a tendency to rotate the arm 23 toward the associated axle section 6, and likewise produce a thrust upon the arm 16 tending to rotate the associated shaft 7 toward the corresponding axle section 6. The relative lengths of the two portions of the arm 17 are so related that relatively small tension on the cable 19 will result in an appreciable pull on the rod 20, and inasmuch as the arm 23 is of a length substantially greater than the radial extent of the pivotal connection of the brake shoe to the shaft 7, an appreciable force will be applied to each of the shoes 9. In a preferred form of the invention the force tending to rotate the arm 23 or the pull on the rod 20 is approximately 4,000 pounds, which results in transmitting approximately 4,000 pounds pressure to each of the shoes 9 controlled by the arm 23 when the arm 23 is of a length substantially twice the radial distance from the shaft 7 to the pivotal connection of the shoes 9. Similarly the arm 16 is of an appreciably greater length than the radial distance from the associated shaft 7 to the pivotal connection of the shoes 9, and consequently a corresponding thrust of approximately 3,400 pounds, we find in practice, produces a pressure of 4,000 pounds each at the shoes 9. These pressures are produced with a tension on the cable 19 of only slightly over 600 pounds, but it is of course understood that the relative lengths and proportions of the parts of the brake linkage system may be varied widely to meet the desired conditions.

Considering now the actuating means for producing the tension on the cable 19, reference is made to Figures 2, 4 and 5. The actuating means shown in Figure 2 is preferably mounted in a vertically extending position within the car body supported on the truck shown in Figure 1. Suitably secured to the under portion of a frame member forming the floor of the truck or the like is a bracket 30 which has secured thereto the housing 32, which thereby extends from the under surface of the car body. Mounted on the top of the bracket 32 is a flanged collar member 33 which is suitably secured to the bracket by means of the cap bolts 34. The collar is adapted to receive the tubular member 35 which projects upwardly and forms an enclosure for the actuating shaft 36. Preferably, the tube 35 extends into the upper portion of the collar portion 33 and is welded thereto as indicated at 37.

At its upper end the tube 35 is adapted to support a bracket member 38 which is welded or otherwise suitably secured thereto as indicated at 39, which projects laterally from the tube 35 terminating in an offset boss portion 40 adapted to form a support for the shouldered pin 42. Rotatably mounted upon the pin 42 is a cam member 43, more clearly indicated in Figure 5, which has a hub portion 44 provided with toothed surfaces 45 as indicated in dotted lines in Figure 5.

The bracket 38 is provided with a radially directed recess 46 in which is disposed a spring 47 normally forcing the ball member 48 outwardly into engagement with the toothed surfaces 45 of the hub portion 44 of the cam member.

The shaft 36, at its upper end, is provided with a thrust portion 50 upon which is mounted the hand wheel 52 which is keyed to the shaft as indicated at 53. The upper end of the shaft is threaded to receive the nut 54 for holding the wheel 52 in position thereon.

The wheel 52 is preferably provided with a boss portion 55 in one of the spokes thereof which is adapted to receive the cam pin 56 suitably threaded or otherwise secured thereon, and having the end portion 57 adapted to extend down and engage in the sprocket recesses 58 formed by the cam teeth 59 on the member 43.

The member 43 is provided with a suitable pin 60 projecting upwardly from the surface thereof, and which, upon predetermined rotation of the member 43 in one direction, is adapted to be engaged by the end 62 of a coil spring member 63 which extends about the upper end of the pin 42 and has its end portion 64 extending transversely through a slot in the pin and keyed therein by means of the cross pin 65.

Considering now the lower end of the shaft 36, it will be noted that the housing 32 is provided with a boss portion 70 through which the shaft extends, and which forms a bearing for the lower end of the shaft. The housing is provided with a bearing cap member 72 which receives the lower extremity of the shaft and forms a support therefor. A suitable sealing plug 73 is provided in the member 72 to prevent any possibility of the lubricant, indicated at 74, from leaking downwardly along the end of the shaft 36 through the shaft opening in the member 72. Intermediate the bearing supports 70 and 72 the shaft is provided with a worm gear 75 suitably supported by the thrust washers 76 and 77. The gear 75 is keyed for conjoint rotation with the shaft 36, and is adapted for meshing engagement with the worm gear 78 keyed to the shaft 79 extending transversely through the housing, as indicated more clearly in Figure 4. The shaft 79 extends outwardly from one side of the housing and is adapted to receive the drum 80 which is secured thereon for conjoint rotation with the shaft and held in position by the nut 82 threaded over the extending end of the shaft. Preferably, suitable thrust members 83 are provided at opposite ends of the gear 78 and bear respectively against the boss 84 in one face of the housing and the bearing cap 85 secured in the other wall of the housing.

The cable 19 is adapted to be wound about the drum as indicated in Figure 4, and it will be apparent that upon rotation of the shaft 79, the cable will be wound or unwound from the drum, depending upon the direction of rotation of the shaft.

Considering now the operation of the mechanism shown in Figures 2, 4 and 5, the brake mechanism is shown in its applied position. To release the brakes, the hand wheel 52 is rotated in a counter-clockwise direction, as viewed in Figure 5, which results in the end 57 of the pin 56 respectively engaging in the successive recesses 58 between the sprocket teeth 59 until the wheel 43 has been rotated into a position such that the pin 56 engages against the arcuate surface 92 of the wheel 43. In the position shown in Figure 5, the hand wheel 52 has been rotated from the brake released position engaging in the respective teeth of the wheel 43 to the right of the tooth space 58—a into the position shown. In this position it will be noted that the pin 56 has rotated wheel 43 into a position such that spring end 90 is stressed by engagement with the pin 60; and as the hand wheel is further rotated to move the pin 56 out of the tooth space in which it is engaged, the previously tensioned spring 62 moves the wheel 43 in a clockwise direction to a position where the pin 56 will again engage in the last tooth space to the left of the arcuate portion 92 of the wheel 43, and the hand wheel 52 can thus be continuously rotated toward brake applying position, the spring 62 returning the wheel 43 each time so that the pin 56 can enter this last tooth space. At the same time, the tooth section in the serrated portion 45 of the hub of the wheel 43 has one tooth omitted, as indicated at 93, so that as the pin 56 passes outwardly from the recess shown in Figure 5, the ball 48 will prevent any counterclockwise rotation of the sprocket wheel 43 due to the engagement of the pin 60 with the spring end 90. Thus, the sprocket wheel is returned into a position with the first tooth to the left of the portion 92 of the wheel 43 in axial alinement with the pin 42 and shaft 36 so that the hand wheel 52 may be continuously rotated without effecting any further rotation of the sprocket wheel 43 as it snaps back into position, such that upon each rotation of the pin 56, it engages in the recess terminating at the left hand side of the arcuate portion 92 whereby the hand wheel 52 may be rotated until the brakes have been set.

However, when it is desired to release the brakes, the hand wheel 52 is rotated in a counterclockwise direction from the position shown in Figure 5, which results in engagement of the pin 56 on the opposite sides of the teeth 59 starting with the tooth to the left of the arcuate portion 92. This results in clockwise rotation of the sprocket wheel 43 until the sprocket wheel reaches a position such that the arcuate portion 92 lies immediately to the left of the center line between the pin 42 and shaft 54. A further counter-clockwise rotation of the hand wheel 52 will result in the pin 56 abutting against the segment 92, thus preventing further releasing movement being imparted to the drum 80 because of the segment 92 preventing further rotation of shaft 36.

It is to be understood of course that the clockwise rotation of the hand wheel 52 operates through the worm gears 75 and 78 to provide for winding of the cable 19 upon the drum 80, and that counter-clockwise movement of the hand wheel 52 operates through the shaft 36 and the worm gears to unwind the cable from the drum.

Thus it will be apparent that with the mechanism provided, we are able to produce any desired rotation of the hand wheel 52 in a clockwise direction to apply the brakes, but that the mechanism limits the counter-clockwise rotation of the hand wheel 52 so that the only a predetermined unwinding movement of the shaft 36 can be effected, this being limited in the present embodiment of the invention to 11 revolutions, although it is to be understood that, depending upon the amount of slack desired and the ratio of the gears 75 and 78, the mechanism may be provided with any desired type of sprocket wheel having a number of teeth such that the predetermined amount of slack will be provided and the mechanism will be prevented from further unwinding movement by reason of the stop means associated with the sprocket wheel or equivalent controlling member.

The space 93 formed in the serrated portion of the hub 44 of the member 43 allows the sprocket wheel to be sprung back by means of the spring 62 into a position such that upon applying the brakes by clockwise rotation of the hand wheel the wheel can snap past the last tooth adjacent the left hand side of the arcuate portion 92 as viewed in Figure 5 upon successive revolutions without at any time coming into contact with the segment 92. The teeth 45 are so arranged that they are in radial alinement with the recesses 58, whereby the ball 48 will hold each of the teeth 59 in radially alined position between the shaft 36 and the pin 42 upon each successive increment of movement of the sprocket wheel 43, thus presenting a recess 58 on either side of the respective teeth which will receive the end 57 of the pin 56 for effecting rotation of the sprocket wheel.

It is of course obvious that by placing the bracket 38 so that it extends in an opposite lateral direction, the direction of rotation for the brake applying or brake releasing movement of the hand wheel 52 can be reversed without in any way disturbing the underlying principles upon which the present invention is based.

While the mechanism shown in Figures 2, 4 and 5 effectively limits the amount of slack that can be obtained in the brake system under normal operation, it is of course sometimes desirable to provide additional slack in order to release the mechanism so that inspection, repair or replacement of the component parts thereof may be made. This can be done, after wheel 52 is turned to move pin 56 out of engagement with wheel 43, by manually rotating the sprocket wheel 43 from its limiting position shown in Figure 5 clockwise back to a position in which the segment 92 is on the opposite side of the pin 56 so that an additional number of turns may be provided for producing more slack. In order to effect such an operation with the structure shown in Figure 2, it of course is necessary to be within the car body so that the sprocket wheel can be manually reset to allow the increased amount of slack. It may sometimes happen that the repair man will be beneath the car in making his adjustments or repairs, and to avoid the necessity of a second operator within the car, we have provided a modified construction in which the rotation of the shaft and the adjustment of the sprocket wheel with respect thereto can be controlled from beneath the car so that the repair man can place the system back into proper operative condition without having to go into the car body. This is of distinct advantage in cases where only a single repair man is being employed, as he can make the necessary repairs or inspection and can then reset the mechanism directly from a position where the operating portions of the brake system are in clear view.

Figure 3:
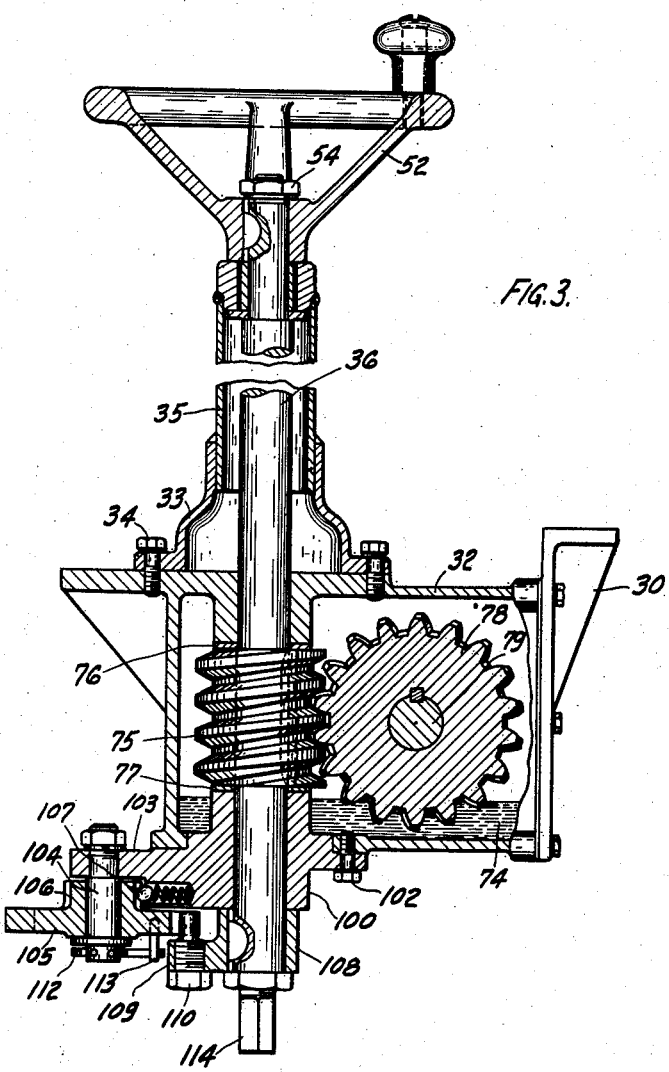

Considering now the modification of the invention shown in Figure 3, similar portions thereof are indicated by corresponding reference numerals.

In the construction shown in Figure 3, the shaft 36' is extended below the housing 32 for an appreciable distance, and is supported at its lower end in the member 100 which is bolted by means of the studs 102 to the bottom of the housing 32.

The member 100 is similar to the bracket member 38 of Figure 2 and has the laterally extending portion 103 which forms a support for the pin member 104 upon which is mounted a sprocket wheel 105 corresponding to the wheel 43 of Figure 2. The hub 106 of the wheel 105 is serrated as described in connection with Figure 2, and is held in its respective actuated positions by means of the spring pressed ball 107.

Below the member 100 the shaft 36' is adapted to carry a sleeve 108 having a lateral extension 109 in which is seated the pin 110, functioning similar to the pin 56 carried by hand wheel 52 of Figure 2, and engaging in the respective sprocket teeth of the wheel 105. A suitable spring 112 is mounted on the lower end of the pin 104 and is adapted to engage the depending pin 113 corresponding to the pin 60 of Figure 2.

At its lower end the shaft 36' is provided with a squared portion 114 which is adapted to receive a wrench or similar tool for effecting rotation thereof from beneath the housing 32. In the operation of the mechanism shown in Figure 3, the repairman, who has inspected or repaired the braking system, is capable of turning the shaft 36' by placing a suitable wrench upon the squared end 114 thereof, and can thus set the amount of slack required in the braking system without the necessity of going into the car body for actuating the hand wheel 52'. The sprocket wheel 105 cooperates with the pin 110 in the same manner in connection with the wheel 43 and pin 56 of Figure 2, allowing any desired number of rotations in brake-applying direction but preventing more than a predetermined number of rotations in the brake releasing position to limit the amount of slack that may be produced in the system. In its other respects, the mechanism is identical with that disclosed in Figure 2, and operates in the same manner.

It is therefore believed apparent that we have provided a novel type of hand brake mechanism and slack adjusting means for trucks of this type, which is independent of and does not interfere with power application of the brakes and which is so arranged as to produce substantially uniform braking pressure at each of the truck wheels. Also, the mechanism is designed so as to allow for proper application of the brakes and yet prevent more than a predetermined amount of slack in the brakes under normal conditions, unless it is desired to manually increase the amount of slack in order to provide for inspection or repair.

Further, it is possible for a single operator to adjust the brakes and set the same from beneath the car after an inspection or repair without the necessity of leaving his vantage point in order to operate the actuating mechanism within the car.

We are aware that various changes in certain of the details of portions of the present invention may be modified considerably without departing from the underlying principles herein described, and we therefore do not intend to be limited except as defined by the scope and spirit of the appended claims.

We claim:

1. Means for controlling the slack in a hand brake mechanism for a rail truck, comprising an actuating shaft, a drum for receiving a tension-applying brake cable, means inter-connecting said shaft and drum for rotation, and means controlled by rotation of said shaft for preventing more than a predetermined number of revolutions thereof in one direction but providing for unlimited rotation in the opposite direction, comprising a laterally offset pin carried by said shaft, a sprocket wheel adapted to be progressively rotated by said pin upon each revolution of said shaft, and means on said wheel blocking said pin against further rotation upon predetermined rotative movement of said wheel.

2. Means for limiting the slack in a hand brake mechanism for a rail truck in which a flexible cable is tensioned to actuate said mechanism, comprising a drum receiving one end of said cable, means including a rotatable shaft for rotating said drum, a pin carried in a laterally offset position and rotatable with said shaft, a sprocket type cam wheel pivotally mounted in a position such that the teeth thereof are selectively engageable by said pin upon each revolution thereof, and means on said cam wheel and engaging said pin for preventing more than a predetermined number of revolutions of said pin in one direction.

3. In combination, an actuating shaft including a laterally offset pin at one end thereof, a drum, gear means interconnecting said drum and shaft intermediate the ends of the shaft, a cam wheel pivotally mounted on one side of said shaft and having a series of teeth in a portion only of the periphery thereof, said pin being engageable between said teeth on successive revolutions of said shaft to rotate said cam wheel one tooth space upon each revolution, spring means operable after predetermined rotation of said wheel in one direction for restraining said wheel in rotation-permitting position upon each succeeding revolution of said pin after a predetermined number of revolutions of said pin in one direction to prevent said pin contacting the remaining peripheral surface of said wheel, said spring means being inoperative upon rotation of said shaft in the opposite direction whereby said pin engages said remaining peripheral surface of said wheel after a predetermined number of revolutions in the opposite direction and prevents further rotation of said shaft.

4. In combination, an actuating shaft including a laterally offset pin at one end thereof, a cable drum, means interconnecting said shaft and drum for rotation, and cam means comprising a sprocket type wheel having tooth spaces in only a portion of its periphery and engageable by said pin upon each revolution of said shaft, said wheel including sprocket controlled means providing unlimited rotation of said shaft in one direction but preventing more than a predetermined number of revolutions of said shaft in the opposite direction.

5. In combination, a hand brake mechanism for a brake system for rail trucks comprising an actuating shaft, a hand wheel at one end thereof for rotating said shaft, a drum geared to said shaft adjacent the opposite end thereof, means trained about said drum for actuating said brake system upon rotation of said shaft in one direction, means at the opposite end of said shaft for preventing more than a predetermined rotation of said shaft in the opposite direction to limit the slack in said system, said slack limiting means including a cam wheel intermittently rotated upon each revolution of said shaft and having an abutment surface stopping further rotation of said shaft in said opposite direction after a predetermined rotation of said cam wheel, and spring means restraining said cam wheel in rotation permitting position as said shaft is rotated in said one direction more than said predetermined amount.

6. A hand brake mechanism comprising an operating shaft having means connected thereto for operating brake rigging upon rotation thereof, a laterally offset pin carried by said shaft, a cam wheel having tooth spaces in a portion only of its periphery engageable by said pin to produce intermittent rotation of said wheel upon each revolution of said shaft throughout a predetermined number of revolutions of said shaft and spring means restraining said wheel in rotation- permitting position after said predetermined number of revolutions of said shaft in brake applying direction only.

7. Slack adjusting means for a hand brake mechanism comprising an actuating shaft for said mechanism having a laterally offset pin, a cam wheel having a predetermined number of tooth spaces engageable by said pin and a peripheral abutment surface, said pin progressively rotating said wheel upon each revolution of said shaft, spring means operable upon a predetermined rotation of said shaft in brake applying direction for restraining said wheel in rotation-permitting position to provide for further rotation of said shaft, said spring means being inoperative upon rotation of said shaft in brake releasing direction whereby said pin engages said abutment surface after rotation of said shaft in said latter direction a predetermined amount to prevent further rotation of said shaft in said latter direction.

8. The combination, with an actuating shaft for hand brake mechanism having a laterally offset pin, of slack adjusting means comprising a cam wheel pivoted adjacent said shaft and having a predetermined number of tooth spaces and an abutment surface, a serrated hub on said wheel and having an open space between certain of said serrations, spring pressed ball means engaging said serrations to control rotation of said wheel, said pin engaging in said tooth spaces to progressively rotate said wheel upon each revolution of said shaft, and spring means operable to restrain said wheel in rotation-permitting position after predetermined rotation of said shaft in brake applying direction only to prevent said pin from engaging said abutment surface, said hub being positioned so that said ball means engages in said open space when said wheel is in said last-named position.

9. The combination, with an actuating shaft for hand brake mechanism having a laterally offset pin, of means adapted to be intermittently rotated by said pin upon each revolution of said shaft and including means engageable by said pin for preventing further rotation of said shaft after a predetermined number of revolutions thereof, and means for restraining said rotatable means in rotation-permitting position after said predetermined rotation of said shaft in brake applying direction only whereby said shaft has unlimited rotation in said direction but only said predetermined rotation in brake releasing direction.

10. The combination, with an actuating shaft for hand brake mechanism having a laterally offset pin, of means adapted to be intermittently rotated by said pin upon each revolution of said shaft and including means engageable by said pin for preventing further rotation of said shaft after a predetermined number of revolutions thereof, and means operable only after rotation of said shaft in brake-applying direction through said predetermined number of revolutions for restraining said rotatable means against movement into a position wherein said pin can engage said rotation preventing means.

ROBERT J. BURROWS.
WILLIAM L. DAVIS.
ALFRED O. WILLIAMS.